United States Patent
Zhang et al.

(10) Patent No.: US 12,218,864 B2
(45) Date of Patent: Feb. 4, 2025

(54) UPLINK COLLISION HANDLING FOR MULTIPLE TRANSMIT-RECEIVE POINT OPERATION

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US); Huaning Niu, San Jose, CA (US); Seyed Ali Akbar Fakoorian, San Diego, CA (US); Sigen Ye, Whitehouse Station, NJ (US)

(73) Assignee: Apple Inc., Cupertino, CA (US)

(*) Notice: Subject to any disclaimer, the term of this patent is extended or adjusted under 35 U.S.C. 154(b) by 540 days.

(21) Appl. No.: 17/440,694

(22) PCT Filed: Oct. 2, 2020

(86) PCT No.: PCT/CN2020/119799
§ 371 (c)(1),
(2) Date: Sep. 17, 2021

(87) PCT Pub. No.: WO2022/067865
PCT Pub. Date: Apr. 7, 2022

(65) Prior Publication Data
US 2023/0137292 A1    May 4, 2023

(51) Int. Cl.
*H04W 4/00* (2018.01)
*H04L 5/00* (2006.01)
(Continued)

(52) U.S. Cl.
CPC ........... *H04L 5/0035* (2013.01); *H04W 72/21* (2023.01); *H04W 72/563* (2023.01)

(58) Field of Classification Search
CPC .......... H04J 2203/0069; H04W 72/04; H04W 72/12; H04W 72/50; H04W 72/1268
See application file for complete search history.

(56) References Cited

U.S. PATENT DOCUMENTS

2018/0199268 A1    7/2018  Wang et al.
2019/0342888 A1*  11/2019  Hosseini ................ H04W 72/20
(Continued)

FOREIGN PATENT DOCUMENTS

CN      110299976        10/2019
CN      110463066 A      11/2019
(Continued)

OTHER PUBLICATIONS

U.S. Appl. No. 17/439,375, Non-Final Office Action, Nov. 7, 2023, 13 pages.
(Continued)

*Primary Examiner* — Shantell L Heiber
(74) *Attorney, Agent, or Firm* — Kilpatrick Townsend & Stockton LLP

(57) ABSTRACT

The present application relates to devices and components including apparatus, systems, and methods to provide collision resolution procedures in wireless communication systems.

7 Claims, 12 Drawing Sheets

(51) Int. Cl.
*H04W 72/21* (2023.01)
*H04W 72/563* (2023.01)

(56) References Cited

U.S. PATENT DOCUMENTS

| | | | | |
|---|---|---|---|---|
| 2019/0364561 | A1* | 11/2019 | Xiong | H04L 5/0051 |
| 2020/0015250 | A1* | 1/2020 | Yang | H04L 5/001 |
| 2020/0053752 | A1* | 2/2020 | Huang | H04W 56/0045 |
| 2020/0163079 | A1* | 5/2020 | Choi | H04B 7/0695 |
| 2020/0205150 | A1* | 6/2020 | Cheng | H04W 72/21 |
| 2020/0252185 | A1* | 8/2020 | Zhang | H04L 5/0053 |
| 2020/0314817 | A1 | 10/2020 | Sun et al. | |
| 2021/0014026 | A1* | 1/2021 | Papasakellariou | H04L 1/1861 |
| 2021/0068195 | A1* | 3/2021 | Yang | H04W 72/56 |
| 2021/0084640 | A1* | 3/2021 | Kang | H04L 5/0048 |
| 2022/0140859 | A1 | 5/2022 | Takeda et al. | |
| 2023/0171045 | A1 | 6/2023 | Matsumura et al. | |
| 2023/0344555 | A1 | 10/2023 | Yuan et al. | |
| 2023/0354205 | A1* | 11/2023 | Khoshnevisan | H04W 52/146 |

FOREIGN PATENT DOCUMENTS

| | | |
|---|---|---|
| CN | 110535614 | 12/2019 |
| CN | 111278143 | 6/2020 |
| WO | 2019160846 | 8/2019 |
| WO | 2019200313 | 10/2019 |

OTHER PUBLICATIONS

International Patent Application No. PCT/CN2020/119799, International Preliminary Report on Patentability, Apr. 13, 2023, 6 pages.
International Patent Application No. PCT/CN2020/121884, International Preliminary Report on Patentability, May 4, 2023, 6 pages.
3rd Generation Partnership Project; Technical Specification Group Radio Access Network; NR; Multiplexing and channel coding (Release 16), 3GPP TS 38.212 V16.3.0, Sep. 2020, 152 pages.
3rd Generation Partnership Project; Technical Specification Group Radio Access Network; NR; Physical Layer procedures for data (Release 16), 3GPP TS 38.214 V16.2.0, Jun. 2020, 164 pages.
3rd Generation Partnership Project; Technical Specification Group Radio Access Network; NR; Radio Resource Control (RRC) Protocol Specification (Release 16), 3GPP TS 38.331 V16.2.0, Sep. 2020, 921 pages.
Discussion on Multi-TRP Operation, 3GPP TSG RAN WG1 Meeting #99, R1-1912622, Nov. 22, 2019, 3 pages.
Enhancements on Multi-TRP for PDCCH, PUCCH and PUSCH, Qualcomm Incorporated, 3GPP TSG-RAN WG 1 Meeting#102-e, R1-2006791, Aug. 17-28, 2020, 14 pages.
Multi-TRP enhancements for PDCCH, PUCCH and PUSCH, ZTE, 3GPP TSG RAN WGI Meeting #102-e , RI-2005455, Aug. 17-28, 2020, 12 pages.
International Patent Application No. PCT/CN2020/119799, Oct. 2, 2020, 105 pages.
International Patent Application No. PCT/CN2020/119799, International Search Report and Written Opinion, Mailed on Jun. 29, 2021, 9 pages.
International Patent Application No. PCT/CN2020/121884, International Search Report and Written Opinion, Mailed on Jul. 15, 2021, 9 pages.
3rd Generation Partnership Project; Technical Specification Group Radio Access Network; NR; Physical layer procedures for control (Release 16), 3GPP TS 38.213 V16.2.0, Jun. 2020, 176 pages.
3rd Generation Partnership Project; Technical Specification Group Radio Access Network; NR; Physical layer procedures for data (Release 16), 3GPP TS 38.214 V16.3.0, Sep. 2020, 167 pages.
3rd Generation Partnership Project; Technical Specification Group Radio Access Network; NR; Radio Resource Control (RRC) protocol specification (Release 16), 3GPP TS 38.331 V16.1.0, Jul. 2020, 906 pages.
Le et al., An Overview of Physical Layer Design for Ultra-Reliable Low-Latency Communications in 3GPP Releases 15, and 16, IEEE Access, vol. 9, pp. 433-444, 2021.
China Patent Application No. 202080106371.1, Office Action, Jul. 5, 2024, 13 pages.

* cited by examiner

800

Identifying a collision between a first uplink channel transmission and a second uplink channel transmission
804

Determining target TRPs for the first and second physical uplink channel transmissions
808

Performing a collision resolution procedure based on the target TRPs
812

Transmitting the first or second physical uplink channel transmissions
816

900

Detecting a collision between first PUCCH repetitions and second PUCCH repetitions
904

Determining priority information associated with first and second PUCCH repetitions
908

Determining first PUCCH repetitions have relatively higher priority
912

Transmitting the first PUCCH repetitions and dropping one or more of the second PUCCH repetitions
916

UPLINK COLLISION HANDLING FOR MULTIPLE TRANSMIT-RECEIVE POINT OPERATION

CROSS REFERENCE TO RELATED APPLICATION

This application is the U.S. National Phase of PCT Application No. PCT/CN2020/119799, filed Oct. 2, 2020, the disclosure of which is incorporated by reference.

BACKGROUND

Third Generation Partnership Project (3GPP) networks provide that a gNB may use multiple transmit—receive points (TRPs) to send information to, or receive information from, one user equipment (UE). The UE may have a plurality of antenna panels configured to send or receive this information. Releases 15 and 16 of 3GPP introduce reliability enhancement schemes for physical uplink control channel (PUCCH) and physical uplink shared channel (PUSCH) transmissions to multiple TRPs.

DETAILED DESCRIPTION

Figure 1:
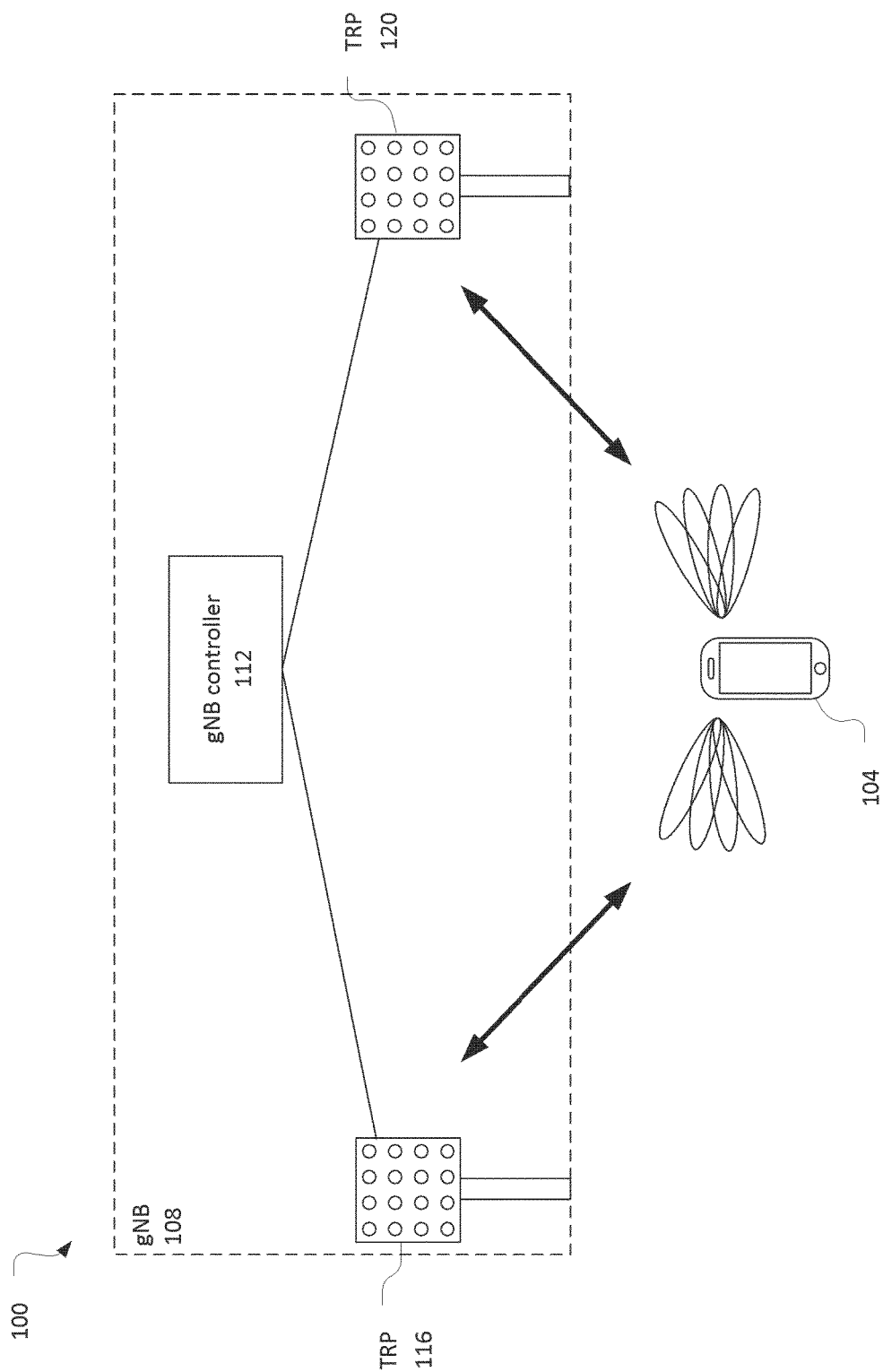
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides one or more wireless access cells, for example, 3GPP New Radio "NR" cells, through which the UE 104 may communicate with the gNB 108. The UE 104 and the gNB 108 may communicate over an air interface compatible with 3GPP technical specifications such as those that define Fifth Generation (5G) NR system standards.

The gNB 108 may include a gNB controller 112 coupled with one or more TRPs, for example, TRP 116 and TRP 120. In general, the gNB controller 112 may perform the majority of the operations of a communication protocol stack, including scheduling, while the TRPs 116 and 120 act as distributed antennas. In some embodiments, the TRPs 116 and 120 may perform some lower-level operations of the communication protocol stack (for example, analog physical (PHY) layer operations).

The gNB 108 may use the TRPs 116 and 122 to geographically separate points at which a signal may be transmitted to, or received from, the UE 104. This may increase flexibility of using multiple-input, multiple-output and beamforming enhancements for communicating with the UE 104. The TRPs 116 and 120 may be used to transmit downlink transmissions to the UE 104 and receive uplink transmissions from the UE 104. In some embodiments, the distributed transmit/receive capabilities provided by the TRPs 116 and 120 may be used for coordinated multipoint or carrier aggregation systems.

The gNB 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The UE 104 and the TRPs 116 may include an array of antenna elements in one or more antenna panels that allow receive or transmit beamforming. Beamforming may improve the uplink and downlink budgets by determining and using uplink and downlink beams that increase antenna gain and overall system performance. The UE 104 and the gNB 108 may determine desired uplink-downlink beam pairs using beam management operations based on reference signal measurements and channel reciprocity assumptions.

In the downlink direction, the TRPs 116 and 120 may send synchronization signal blocks (SSBs) and channel state information—reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for PUSCH and PUCCH transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

In addition to beam management, the SRSs may be used for uplink channel-aware scheduling and link adaptation, estimation of the downlink propagation channel when channel reciprocity exists, and both codebook and non-codebook-based transmissions.

The PUCCH may be used to transmit uplink control information (UCI) including, for example, hybrid-automatic repeat request (HARQ) acknowledgements, scheduling requests, and periodic and semi-persistent channel state information (CSI) reports. The PUSCH may be used to transfer user data in the user plane and signaling radio bearer (SRB) messages in the control plane. The PUSCH may also be used to transfer various control information such as, for example, buffer status reports, cell-radio network temporary identifiers (C-RNTIs), configured grant configuration, and power headroom reports.

As briefly discussed above, Release 15 and 16 of 3GPP provide repetitions of PUCCH and PUSCH in some situations to increase reliability. For example, for the longer PUCCH formats (for example, PUCCH formats 1, 3, and 4), the gNB can configure the UE to repeatedly transmit a PUCCH resource in one or more slots. For PUSCH, the gNB can configure the UE to repeatedly transmit the PUSCH with repetition type A or repetition type B. In PUSCH repetition type A, each PUSCH repetition may be mapped to a consecutive slot. For example, a first PUSCH repetition may be mapped to a first slot, a second PUSCH repetition may be mapped to a second slot that immediately follows the first slot, and so on. In PUSCH repetition type B, each PUSCH repetition may be mapped to consecutive symbols. The consecutive symbols may be in one or more slots. In Release 15 and 16, all the repetitions of PUCCH or PUSCH are transmitted from the same beam.

Release 17 of 3GPP introduces further enhancement schemes for PUCCH and PUSCH. For example, PUCCH/PUSCH may be transmitted repeatedly within a slot or across slots where different beams may be used for different repetitions. The repetitions of different beams may be transmitted to the same or different TRPs.

PUCCH repetitions transmitted on different beams may use different PUCCH resources to transmit the same UCI. The resources configured for the PUCCH repetitions may be in one or more slots. Alternatively, PUCCH repetitions transmitted on different beams may use a PUCCH resource configured with more than one beam. Thus, there may be two ways to implement PUCCH repetition. First, more than one PUCCH resource may be configured to transmit the UCI. Second, more than one beam may be configured for a PUCCH resource that is used to transmit the UCI. The different beams used for transmitting the PUCCH repetitions may be defined by different spatial relations, transmission configuration indicators (TCIs), or power control parameters.

PUSCH repetitions transmitted on different beams may use different time/frequency resources configured by RRC or granted by a single downlink control information (DCI) or multiple DCIs to transmit the same PUSCH payload. The resources configured for the PUSCH repetitions may be in one or more slots. The different beams used for transmitting the PUSCH repetitions may be defined by different SRS resource indicators (SRIs), transmission precoder matrix indicators (TPMIs), or power control parameters.

In some situations, uplink transmissions may collide with one another. For example, a mapping function in the UE 104 may map first and second uplink transmissions on the same or at least partially overlapping uplink resources. In these situations, the UE 104 may need to perform a collision resolution procedure to determine the transmissions to be sent on the uplink resources. Collision resolution procedures may be defined for a variety of uplink collisions including the following seven specific cases. Case 1 includes a collision between a PUCCH without repetition and a PUSCH with repetition type A. Case 2 includes a collision between a PUCCH without repetition and a PUSCH with repetition type B. Case 3 includes a collision between PUCCH with repetition and PUSCH with repetition of type A or B. Case 4 includes a collision between a PUCCH with repetition and another PUCCH with repetition. Case 5 includes a collision between a PUCCH with repetition and a PUSCH without repetition. Case 6 includes a collision between a PUCCH with repetition and an SRS. Case 7 includes a collision between a PUSCH with repetition and an SRS.

Collision resolution procedures for uplink transmissions from a plurality of beams may follow one or more of the following principles. First, it may be desirable to keep UCI transmitted with multi-beam operation to improve reliability. Second, priority of UCI may be based on a target receiving TRP. Third, it may be desirable to transmit UCI based on the correct beam targeting to the corresponding receiving TRP. Various embodiments describe collision resolution procedures influenced by these principles.

Collision resolution procedures with respect to case 1—PUCCH without repetition colliding with PUSCH with repetition type A—may be addressed as follows.

Figure 2:
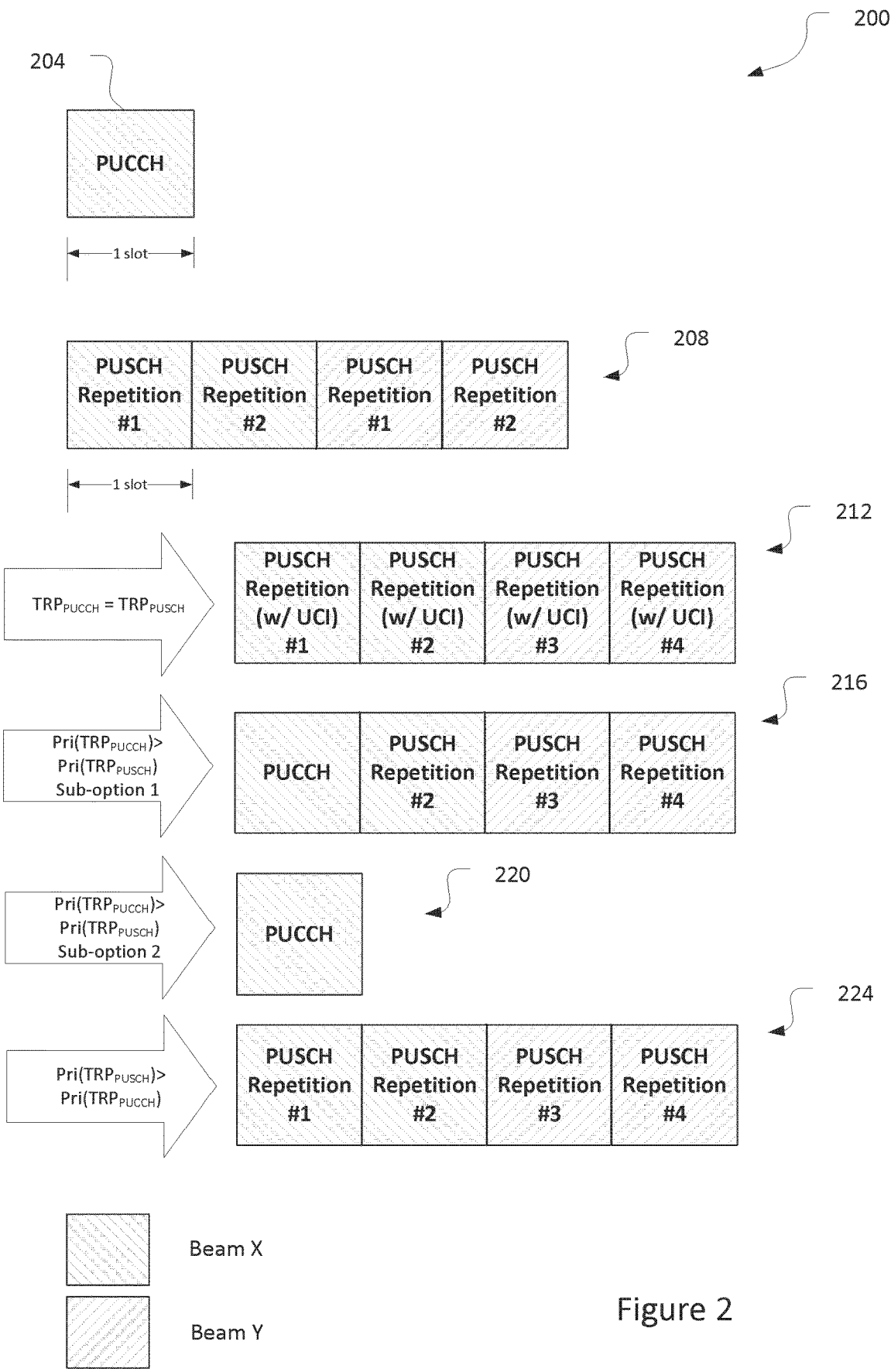
FIG. 2 illustrates a collision resolution procedure in accordance with some embodiments.

A first option, driven by the second and third principles described above, may determine uplink transmissions based on target TRPs of the PUCCH and PUSCH. For example, if the PUCCH and the PUSCH are associated with the same TRP (for example, they are to be transmitted to the same TRP), the UCI from the PUCCH may be multiplexed to all of the PUSCH repetitions. If the PUCCH in the PUSCH are not associated with the same TRP, the UE 104 may drop the PUCCH, the PUSCH repetition in overlapped symbols, or all the PUSCH repetitions. The transmissions to be dropped may be based on a priority determined by an associated TRP index. FIG. 2 illustrates a collision resolution procedure 200 that describe these concepts in accordance with some embodiments.

As shown in FIG. 2, the UE 104 may receive a PUCCH 204 for transmission on a first beam, for example beam X, and may also receive PUSCH repetitions 208. The first two PUSCH repetitions, for example, PUSCH repetition #1 and #2, may be scheduled for transmission on beam X, while the last two PUSCH repetitions, for example, PUSCH repetitions #3 and #4, may be scheduled for transmission on beam Y.

In the collision resolution procedure 200, the UE 104 may determine that PUCCH 204 is to collide with PUSCH repetition #1 of PUSCH repetitions 208. The UE 104 may determine the uplink transmissions based on target TRPs of the PUCCH 204 and the PUSCH repetitions 208. In some embodiments, the target TRPs may be determined based on control resource set (CORESET) information corresponding to the PDCCH that schedules the PUCCH 204 and the PUSCH repetitions 208.

The gNB 108 may transmit the scheduling PDCCHs using resource elements that belong to a CORESET. A search space configuration may refer to a particular CORESET to define a search space, for example, a specific set of resource blocks and symbols where the UE 104 is to attempt to decode the PDCCH. The gNB 108 may configure up to three CORESETs for an active downlink bandwidth part of a serving cell. The CORESET may be configured by a ControlResourceSet information element that defines frequency domain resources to indicate resource blocks allocated to the CORESET, a duration to indicate a number of symbols allocated to the CORESET (which may be 1, 2, or 3 orthogonal frequency division multiplexing (OFDM) symbols), and quasi-co-location (QCL) information to support a successful reception of the PDCCH. In some embodiments, the gNB 108 may configure one or more CORESET pools to allow TRPs 116 and 120 transmitting PDCCHs that may potentially schedule fully or partially overlapped PUSCHs/PUCCHs in time. To configure the CORESET pools, the gNB 108 may include a CORESET pool index in the ControlResourceSet IE to associate the CORESET with a corresponding CORESET pool. The CORESET pool index may correspond to a TRP index as described herein. In some embodiments, the gNB 108 may configure up to two different CORESET pools.

If the PDCCHs that schedule the PUCCH and the PUSCH are associated with the same CORESET pool, for example, they are both associated with the same CORESET pool index, they may be transmitted from the same TRP. Accordingly, the target TRP for the PUCCH ($TRP_{PUCCH}$) may be the same as the target TRP for the PUSCH ($TRP_{PUSCH}$). In this situation, the UE 104 may multiplex UCI from the PUCCH 204 to all the PUSCH repetitions 208 resulting in PUSCH repetitions of transmission sequence 212. The PUSCH repetitions of transmission sequence 212 may then be transmitted to the TRP.

If $TRP_{PUCCH}$ is different than $TRP_{PUSCH}$, the UE 104 may determine the transmission based on a priority of the associated TRP indices, for example, CORESET pool indices. In some embodiments, the CORESET pool index with the lower value may be considered to have a relatively higher priority.

In some embodiments, if the priority of $TRP_{PUCCH}$ (Pri($TRP_{PUCCH}$)) is greater than the priority of $TRP_{PUSCH}$ (Pri($TRP_{PUSCH}$)), the UE 104 may choose one of two sub-options. In a first sub-option, the UE 104 may drop the PUSCH repetition that collides with the PUCCH 204, for example, PUSCH repetition #1, and transmit the remaining repetitions. This is shown as transmission sequence 216 of FIG. 2. In a second sub-option, the UE 104 may drop all PUSCH repetitions resulting in transmission sequence 220 that only includes the PUCCH. The UE 104 may use this option upon a determination that the likelihood of a successful transmission of the remaining PUSCH repetitions is less than a predetermined threshold. In this scenario, the use of the transmission resources required to transmit only some of the repetitions may not be justified by the likelihood of success.

In some embodiments, if Pri($TRP_{PUSCH}$)) is greater than Pri($TRP_{PUCCH}$), the UE 104 may drop the PUCCH 204. The resulting transmission sequence 224 may then correspond to the PUSCH repetitions 208.

A second option for case 1, driven by the first principle described above, may determine uplink transmissions based on timeline constraints for transmitting UCI. The timeline constraints may be based on configuration information provided by the gNB 108 or processing capability of the UE 104. For example, if the UCI includes HARQ-ACK information related to a reception of PDSCH, the UE 104 may need a certain amount of time to process the PDSCH and generate the corresponding HARQ-ACK information. Therefore, the UE 104 may not be able to multiplex UCI onto PUSCH repetitions that occur before the time needed for these operations. In some embodiments, the timeline constraints may be consistent with those described in 3GPP Technical Specification (TS) 38.213 v16.2.0 (2020-06).

Figure 3:
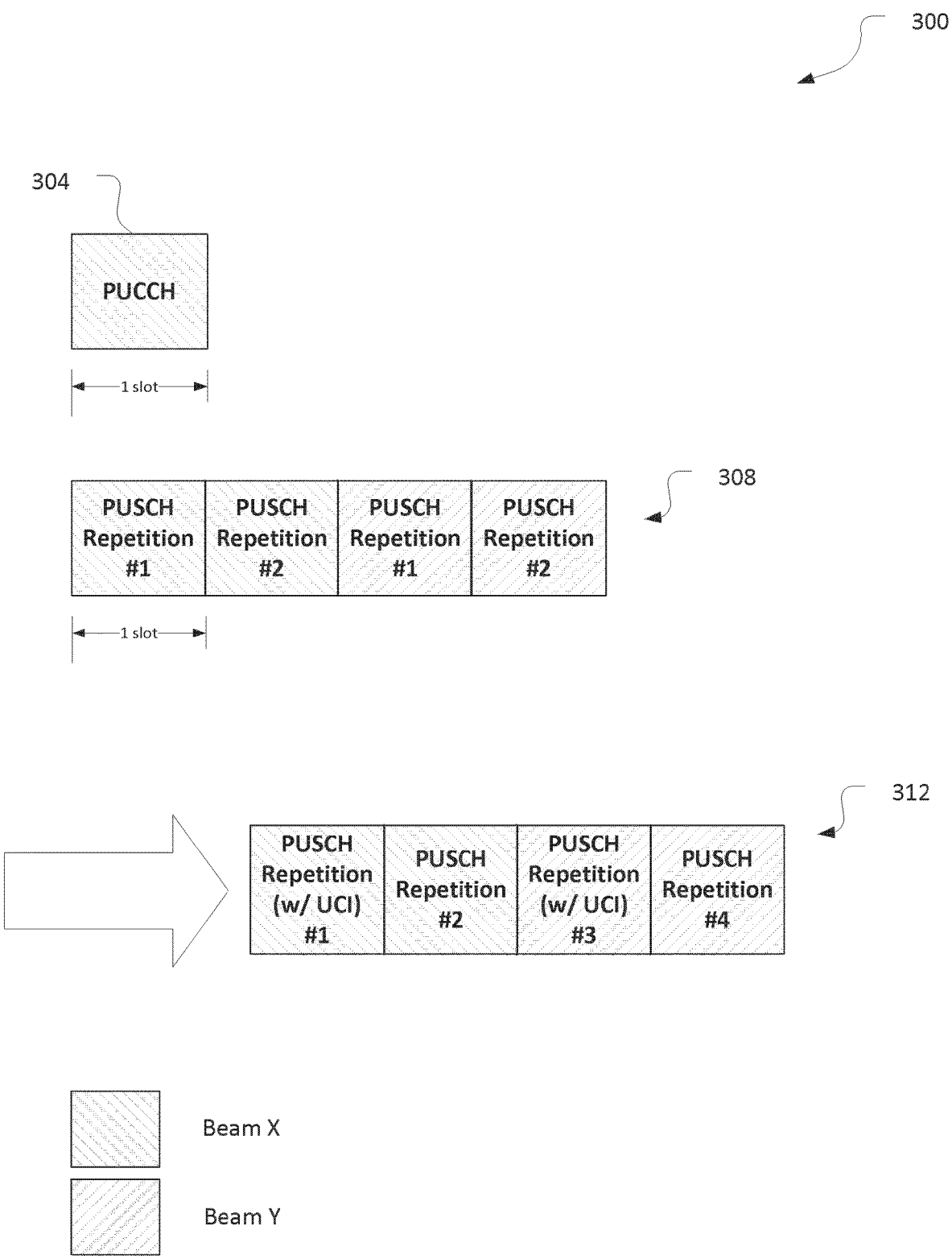
FIG. 3 illustrates another collision resolution procedure in accordance with some embodiments.

FIG. 3 illustrates a collision resolution procedure 300 that may be used for the second option of case 1 in accordance with some embodiments. Similar to the collision resolution procedure 200, collision resolution procedure 300 includes a PUCCH 304 that conflicts with a first repetition of PUSCH repetitions 308. In this embodiment, the UE 104 may determine that: PUSCH repetition #1 is the first PUSCH repetition for the transmit beam X that satisfies the timeline constraints; and PUSCH repetition #2 is the first PUSCH repetition for the transmit beam Y that satisfies the timeline constraints. Therefore, the UE 104 may generate the sequence 312 in which UCI is multiplexed to PUSCH repetition #1 and PUSCH repetition #3.

In some embodiments, the second option of case 1 may be used regardless of the associated TRP indices. Alternatively, the second option of case 1 may be employed when both the PUSCH and the PUCCH are directed to the same TRP. Thus, it could be used as an alternative to transmission sequence 212.

Collision resolution procedures for case 2—PUCCH without repetition colliding with PUSCH with repetition type B—may include first and second options that may be similar to those described above with respect to case 1. Case 2 may also include a third option as discussed herein.

Figure 4:
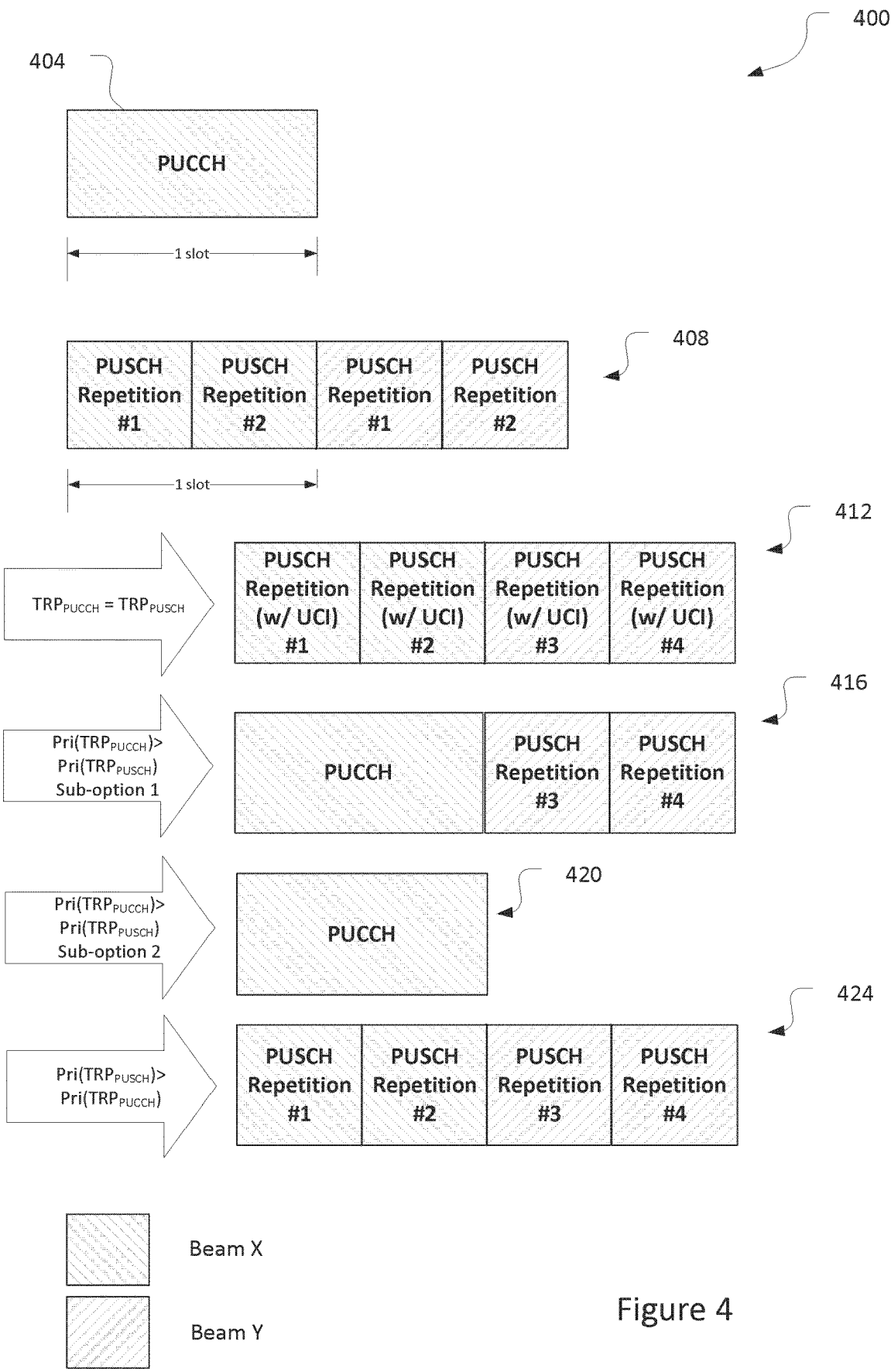
FIG. 4 illustrates another collision resolution procedure in accordance with some embodiments.

FIG. 4 includes a collision resolution procedure 400 in accordance with some embodiments. The collision resolution procedure 400 may correspond to a first option for case 2, where a PUCCH without repetition collides with PUSCH with repetition type B. In particular, PUCCH 404 may collide with the first two repetitions of the PUSCH repetitions 408. Given that the PUSCH repetitions 408 are of a repetition type B, one slot may include more than one repetition. As shown, one slot may include two repetitions.

If the PUCCH 404 and the PUSCH repetitions 408 are associated with the same TRP, for example, $TRP_{PUSCH}$ equals $TRP_{PUCCH}$, the UE 104 may multiplex UCI from the PUCCH 404 to all the PUSCH repetitions 408 resulting in PUSCH repetitions of transmission sequence 412. The PUSCH repetitions of transmission sequence 412 may then be transmitted to the TRP.

If the PUCCH 404 and the PUSCH repetitions 408 are associated with different TRPs, e.g., If $TRP_{PUCCH}$ is different than $TRP_{PUSCH}$, the UE 104 may determine the transmission based on a priority of the associated TRP index, for example a CORESET pool index. In some embodiments, the CORESET pool index with the lower value may be considered to have a relatively higher priority.

In some embodiments, if Pri($TRP_{PUCCH}$) is greater than Pri($TRP_{PUSCH}$), the UE 104 may choose one of two sub-options. In a first sub-option, the UE 104 may drop the PUSCH repetitions that collide with the PUCCH 404, for example, PUSCH repetitions #1 and #2, and transmit the remaining repetitions. This is shown as transmission sequence 416 of FIG. 4. In a second option, the UE 104 may drop all PUSCH repetitions resulting in transmission sequence 420 that only includes the PUCCH.

In some embodiments, if Pri($TRP_{PUSCH}$)) is greater than Pri($TRP_{PUCCH}$), the UE 104 may drop the PUCCH 204. The resulting transmission sequence 424 may then correspond to the PUSCH repetitions 208.

Figure 5:
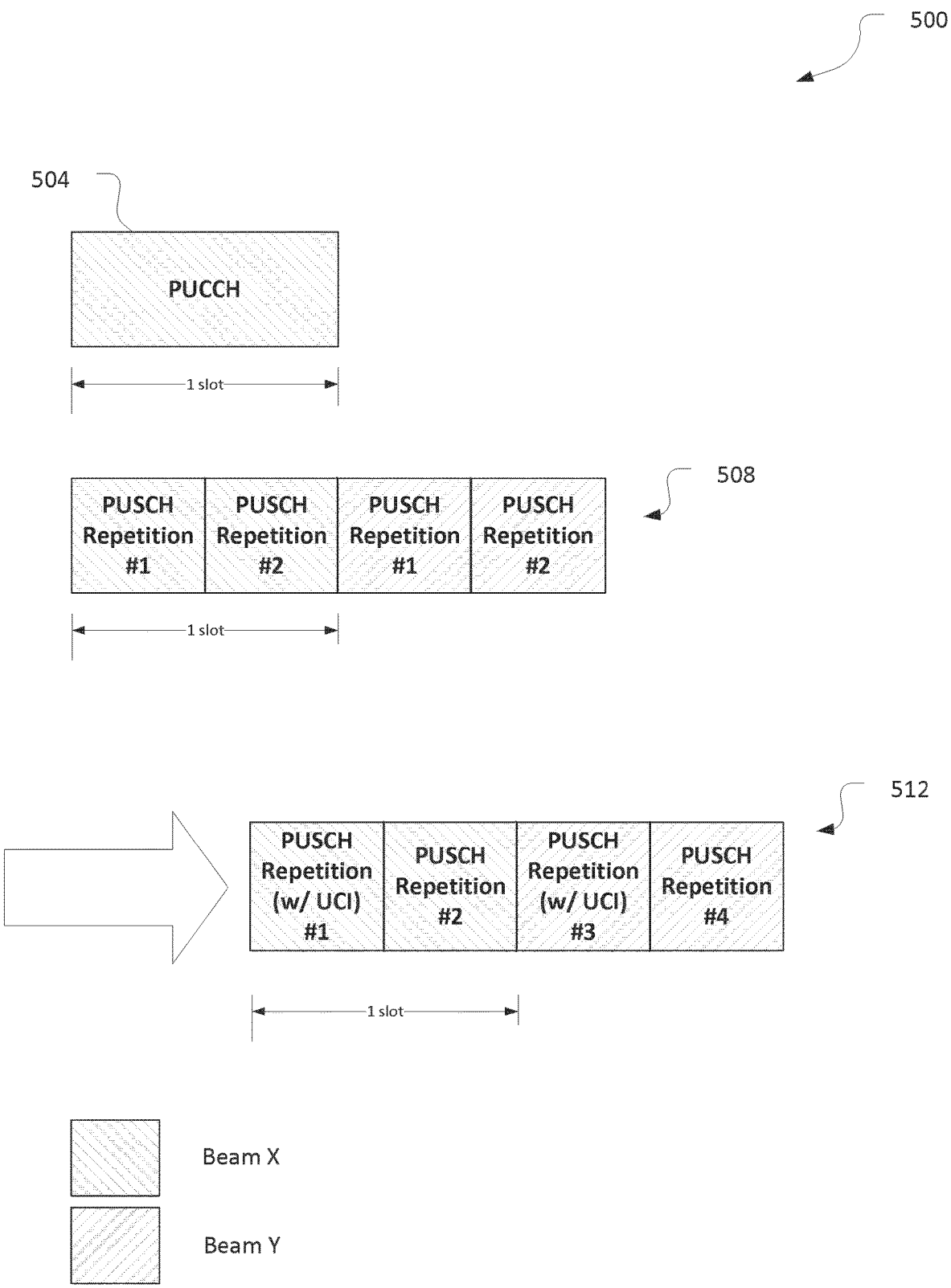
FIG. 5 illustrates another collision resolution procedure in accordance with some embodiments.

FIG. 5 illustrates a collision resolution procedure 500 that may be used for the second option of case 2 in accordance with some embodiments. Collision resolution procedure 500 includes a PUCCH 504 that conflicts with first and second repetitions of PUSCH repetitions 508. In this embodiment, the UE 104 may multiplex the UCI to the first actual PUSCH repetitions among the repetitions that meet the timeline constraint (defined in section 9.2.5 of TS 38.214, for example) with the same beam. As used herein, the first "actual PUSCH" may refer to the first PUSCH transmission that is actually to be transmitted. The UE 104 may determine that: PUSCH repetition #1 is the first PUSCH repetition for the transmit beam X that satisfies the timeline constraints; and PUSCH repetition #3 is the first PUSCH repetition for the transmit beam Y that satisfies the timeline constraints. Therefore, the UE 104 may generate the sequence 512 in which the UCI is multiplexed to PUSCH repetition #1 and PUSCH repetition #3.

The collision resolution procedure 500 may be independent of the TRP indices associated with the PUSCH/PUCCH transmissions. Alternatively, the collision resolution procedure 500 may be used when the TRP indices are the same, for example, as an alternative to transmission sequence 412.

In some embodiments, a third option for a collision resolution procedure for case 2, which may also be based on principle 1, may be used. In this option, the UCI may be multiplexed to all the PUSCH repetitions. In various embodiments, this may be based on, or independent from, consideration of target TRPs associated with the PUCCH or PUSCH transmissions.

In some embodiments, case 3—PUCCH with repetition colliding with PUSCH with repetition type A or B—may include options 1-3 similar those described above with respect to case 2, for example.

Figure 6:
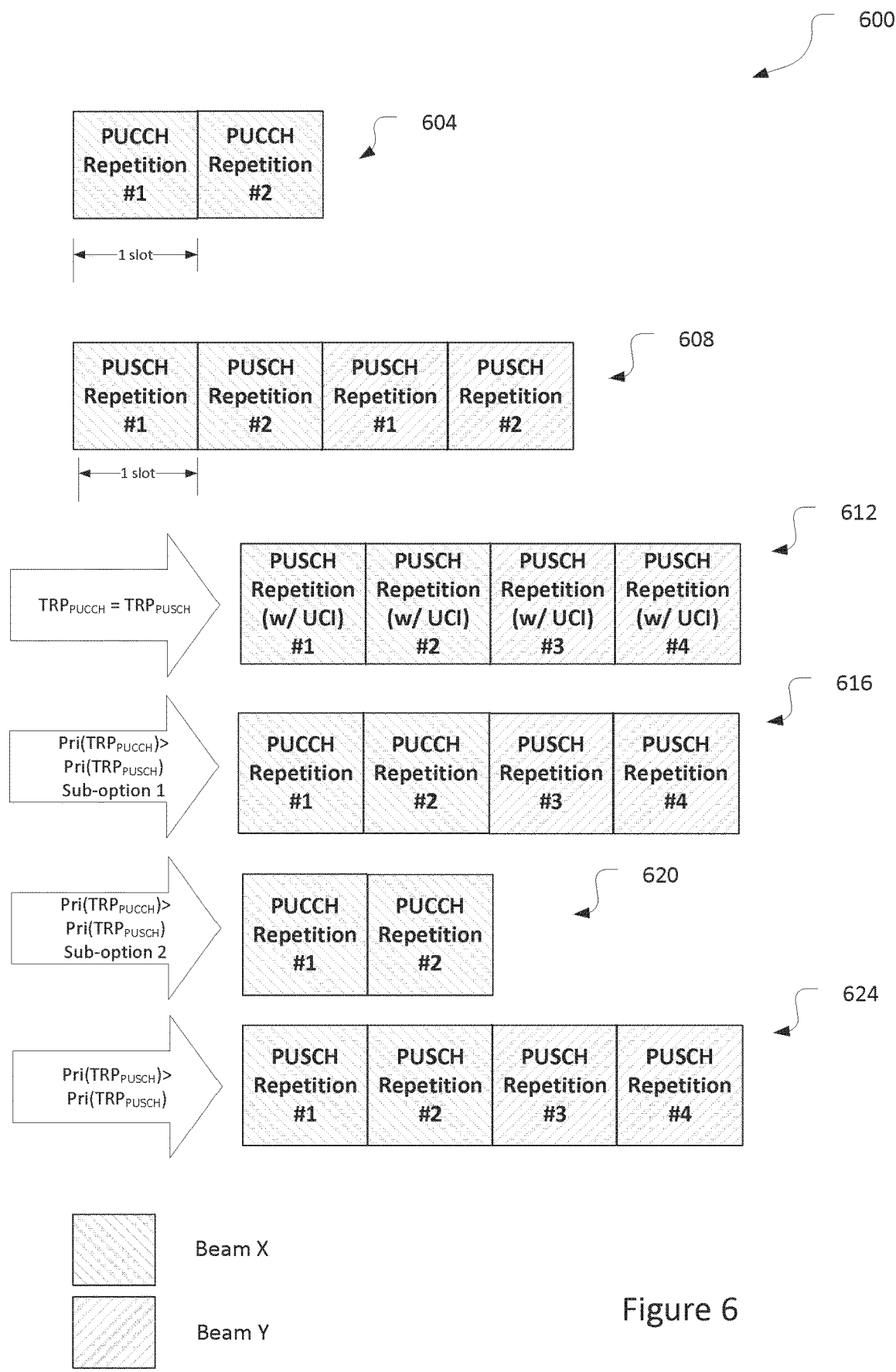
FIG. 6 illustrates another collision resolution procedure in accordance with some embodiments.

FIG. 6 includes a collision resolution procedure 600 in accordance with some embodiments. Collision resolution procedure 600 may be based on principles 2 and 3.

The collision resolution procedure 600 may correspond to a first option for case 3, where a PUCCH with repetition collides with PUSCH with repetition type A or B. In particular, PUCCH repetitions 604 may collide with the first two repetitions of the PUSCH repetitions 608. The PUSCH repetitions 608 are shown with repetition type A, with one repetition per slot; however, similar concepts are also applicable to PUSCH repetitions of type B.

If the PUCCH repetitions 604 and the PUSCH repetitions 608 are associated with the same TRP, for example, $TRP_{PUSCH}$ equals $TRP_{PUCCH}$, the UE 104 may multiplex UCI from the PUCCH repetitions 604 to all the PUSCH repetitions 608 resulting in PUSCH repetitions of transmission sequence 612. The PUSCH repetitions of transmission sequence 612 may then be transmitted to the TRP.

If the PUCCH repetitions 604 and the PUSCH repetitions 608 are associated with different TRPs, e.g., if $TRP_{PUCCH}$ is different than $TRP_{PUSCH}$, the UE 104 may determine the transmission based on a priority of the associated TRP index, for example, a CORESET pool index. In some embodiments, the CORESET pool index with the lower value may be considered to have a relatively higher priority.

In some embodiments, if $Pri(TRP_{PUCCH})$ is greater than $Pri(TRP_{PUSCH})$, the UE 104 may choose one of two sub-options. In a first sub-option, the UE 104 may drop the PUSCH repetitions that collide with the PUCCH repetitions 604, for example, PUSCH repetitions #1 and #2, and transmit the remaining repetitions. This is shown as transmission sequence 616 of FIG. 6. In a second sub-option, the UE 104 may drop all PUSCH repetitions resulting in transmission sequence 620 that only includes the PUCCH repetitions.

In some embodiments, if $Pri(TRP_{PUSCH}))$ is greater than $Pri(TRP_{PUCCH})$, the UE 104 may drop one or more of the PUCCH repetitions 604. The resulting transmission sequence 624 may then correspond to the PUSCH repetitions 608. In some embodiments, only the PUCCH repetitions with overlapped symbols may be dropped. For example, if one or more PUCCH repetitions do not overlap with the PUSCH repetitions, those may be transmitted. In other embodiments, all the PUCCH repetitions may be dropped even if only some of the PUCCH repetitions overlap with PUSCH repetitions.

Figure 7:
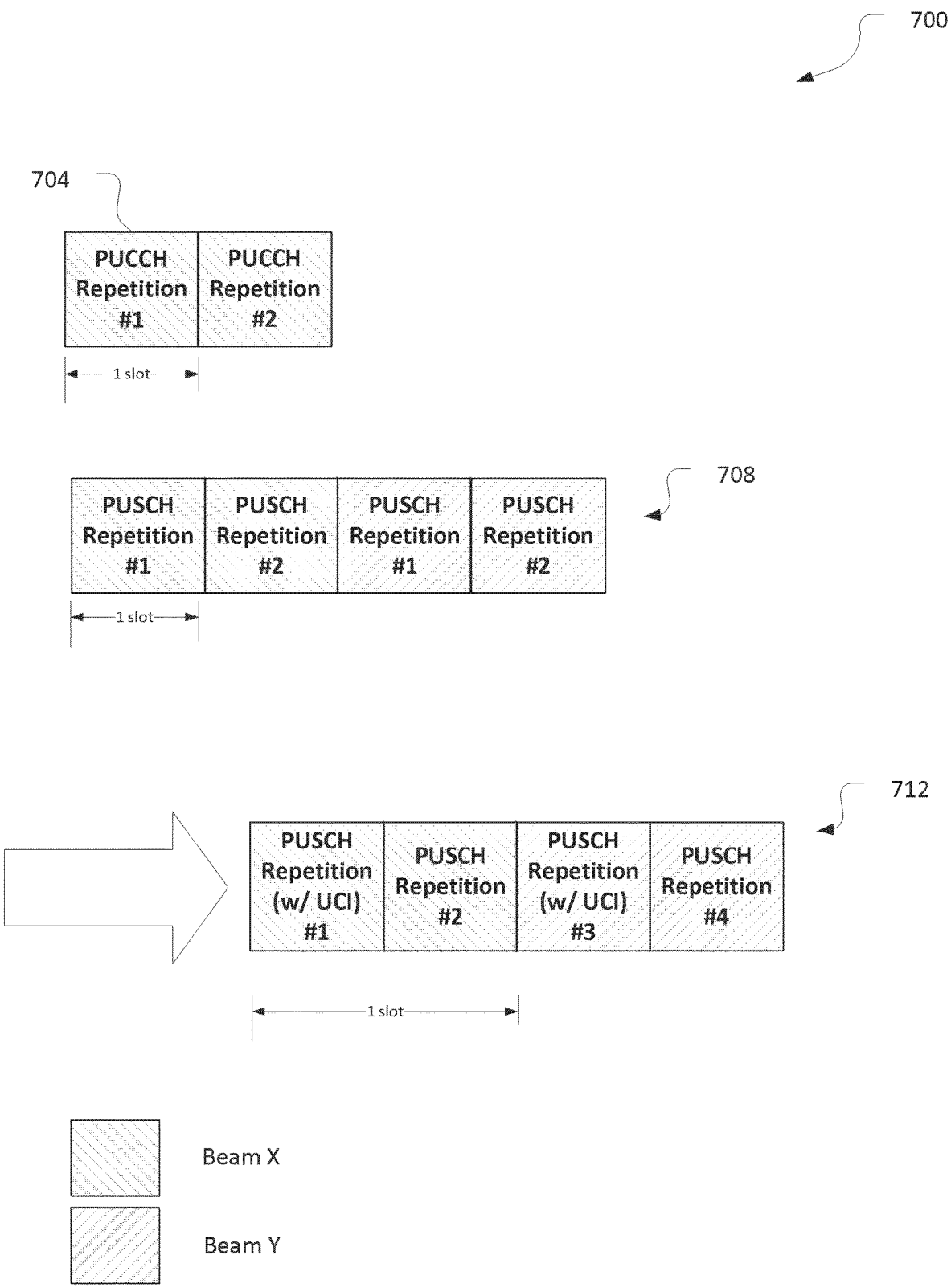
FIG. 7 illustrates another collision resolution procedure in accordance with some embodiments.

FIG. 7 illustrates a collision resolution procedure 700 that may be used for the second option of case 3 in accordance with some embodiments. Collision resolution procedure 700 may be based on principle 1.

Collision resolution procedure 700 includes PUCCH repetitions 704 that collide with first and second repetitions of PUSCH repetitions 708. In this embodiment, the UE 104 may multiplex the UCI to the first actual PUSCH repetitions among the repetitions that meet the timeline constraint (defined in section 9.2.5 of TS 38.214, for example) with the same beam. The UE 104 may determine that: PUSCH repetition #1 is the first PUSCH repetition for the transmit beam X that satisfies the timeline constraints; and PUSCH repetition #3 is the first PUSCH repetition for the transmit beam Y that satisfies the timeline constraints. Therefore, the UE 104 may generate the sequence 712 in which the UCI is multiplexed to PUSCH repetition #1 and PUSCH repetition #3.

The collision resolution procedure 700 may be independent of the TRP indices associated with the PUSCH/PUCCH transmissions. Alternatively, the collision resolution procedure 700 may be used when the TRP indices are the same, for example, as an alternative to transmission sequence 612.

In some embodiments, a third option for a collision procedure for case 3, which may also be based on principle 1, may be used. In this option, the UCI may be multiplexed to all the PUSCH repetitions. In various embodiments, this may be based on, or independent from, consideration of target TRPs associated with the PUCCH or PUSCH transmissions.

In some embodiments, different options may be used for PUCCH with repetitions within a slot or across slots. For example, option 1 may be used when PUCCH repetitions are within a slot, while option 2 may be used when PUCCH repetitions are across slots. Other options may be used in other embodiments.

Collision resolution procedures to address case 4—PUCCH with repetition colliding with another PUCCH with repetition—may be based on relative priorities of the PUCCHs. The priority-based collision-resolution procedure, which may be based on principles 1-3, may include the UE 104 dropping at least some of the PUCCH repetitions having lower priority.

In various embodiments, priority may be based on one or more of: UCI type, an associated TRP index (for example, a CORESET pool index); a number beams configured across all repetitions for the PUCCH transmission; a starting slot index; or a repetition type (for example, intra-slot repetition or inter-slot repetition).

With respect to UCI type, some embodiments may include, in order of decreasing priority, HARQ-ACK, SR, CSI with high-priority, and CSI with low priority.

With respect to associated TRP index, some embodiments may assign a higher priority to a lower index, which may be a TRP index or a CORESET pool index.

With respect to a number of beams, some embodiments may assign a higher priority to a PUCCH having repetitions on more beams. For example, if a first PUCCH has repetitions across three beams, and a second PUCCH has repetitions across to beams, the first PUCCH may have a higher priority than the second PUCCH. In other embodiments, the priorities may be reversed with the second PUCCH having the relatively higher priority.

With respect to the starting slot index, some embodiments may assign a higher priority to the PUCCH that has the earlier starting slot index.

With respect to the repetition type, some embodiments may assign a higher priority to the PUCCH having an intra-slot repetition. Other embodiments may reverse the priority and the PUCCH having inter-slot repetitions may be afforded the higher priority.

Various embodiments may include nested priorities based on the above PUCCH characteristics. A first example may include the following. The PUCCH priority is first determined by a number of beams to be used to transmit the PUCCH repetitions. If the number of beams of the same, the priority is determined by UCI type. If the UCI type is the same, the priority is determined by the starting slot index. A second example may include the following. The PUCCH priority is first determined by associated TRP indices. If the PUCCHs are associated with the same TRP index, the priority may be determined by UCI type. If the UCI type is the same, the priority may be determined by the starting slot index. Other embodiments may include other nested priority examples.

Embodiments addressing case 5—PUCCH with repetition colliding with PUSCH without repetition—may be addressed as follows. The UE 104 may determine whether to drop the PUSCH or the PUCCH based on option 1 of case 1. See, for example, the collision resolution procedure 200 of FIG. 2.

Embodiments addressing case 6—PUCCH with repetition colliding with an aperiodic SRS—may be addressed as follows. If priority for the PUCCH is configured to be 0, only the PUCCH repetitions and overlapped symbols may be dropped. This may be applied for PUCCH with repetitions within a slot or across slots.

For case 7, PUSCH with repetition colliding with an SRS, if the PUSCH is configured with a priority equal to 1, the UE 104 may not transmit the SRS and overlapped symbols. Otherwise, the collision may not be allowed in the SRS may be transmitted after the PUSCH.

In some embodiments an additional option may be considered to introduce a higher-layer signaling to determine the channel that should be dropped. This higher-layer signaling, which may be RRC signaling, may be used in any one of the cases 1-7. In various embodiments, a default collision resolution procedure may operate such as that described above in any one of cases 1-7. This default procedure may be overridden by the higher-layer signaling.

In some embodiments, scheduling restrictions may be introduced to avoid the specific collisions described above with respect to cases 1-7.

Figure 8:
FIG. 8 illustrates an operational flow/algorithmic structure in accordance with some embodiments.

FIG. 8 may include an operation flow/algorithmic structure 800 in accordance with some embodiments. The operation flow/algorithmic structure 800 may be performed or implemented by a UE such as, for example, UE 104 or 1200; or components thereof, for example, baseband processor 1204A.

The operation flow/algorithmic structure 800 may include, at 804, identifying a collision between a first uplink channel transmission and a second uplink channel transmission. The first and second uplink channel transmissions may be PUSCH or PUCCH transmissions, with or without repetitions. If the physical uplink channel transmissions include repetitions, the repetitions may be in consecutive slots (for example, repetition type A) or in consecutive symbols within a slot or across slots (for example, repetition type B).

In some embodiments, the collision may be identified at a mapping function in physical layer processing of the UE. The collisions may occur based on the transmissions being at least partially overlapping in time or frequency. In various embodiments, the collisions may be similar to any of the collisions described above with respect to cases 1-7. Additional or alternative collision scenarios may be detected and addressed in various embodiments.

The operation flow/algorithmic structure 800 may further include, at 808, determining target TRPs for the first and second physical uplink channel transmissions. In some embodiments, the target TRPs may be determined based on TRP indices (for example, CORESET pool indices) associated with each of the physical uplink channel transmissions. In some embodiments, the association between the TRP indices and the physical uplink channel transmissions may be based on the PDCCH scheduling or otherwise configuring the resources for the physical uplink channel transmissions.

The operation flow/algorithmic structure 800 may further include, at 812, performing a collision resolution procedure based on the target TRPs. The collision resolution procedure may be similar to any of those described above. For example, in some embodiments the collision resolution procedure may include determining relative priority of the first and second physical uplink channel transmissions based on the target TRP associated with each. In some embodiments this may be done by prioritizing transmissions associated with lower TRP indices. Other embodiments may include other manners of prioritization.

In some embodiments, if the target TRPs are the same, the UCI from a PUCCH transmission may be multiplexed to one or more PUSCH repetitions for transmission. If the target TRPs are different, the transmission associated with the relatively higher priority TRP may be transmitted, and some or all of the transmission associated with the relatively lower priority TRP may be dropped.

The operation flow/algorithmic structure 800 may further include, at 816, transmitting the first or second physical uplink channel transmissions. In some embodiments, only the higher priority physical uplink channel transmission may ultimately be transmitted. In other embodiments, portions of the lower-priority physical uplink channel transmission may also be transmitted. For example, non-overlapped repetitions of the lower-priority physical uplink channel transmission may be transmitted in some embodiments. In other embodiments, information from the lower-priority physical uplink channel transmission may be multiplexed with the higher-priority physical uplink channel transmission as described herein.

Figure 9:
FIG. 9 illustrates another operational flow/algorithmic structure in accordance with some embodiments.

FIG. 9 may include an operation flow/algorithmic structure 900 in accordance with some embodiments. The operation flow/algorithmic structure 900 may be performed or implemented by a UE such as, for example, UE 104 or 1200; or components thereof, for example, baseband processor 1204A.

The operation flow/algorithmic structure 900 may include, at 904, detecting a collision between first PUCCH repetitions and second PUCCH repetitions. The collision detected at 904 may correspond to case 4 described herein.

The operation flow/algorithmic structure 900 may further include, at 908, determining priority information associated with the first and second PUCCH repetitions. The priority information may include information related to parameters that configure the respective PUCCH repetitions for transmission. In some embodiments, these parameters may include information related to target TRP (for example, associated TRP indices), a number of beams on which the respective PUCCH repetitions are to be transmitted, a starting slot in which the respective PUCCH repetitions are to be transmitted, repetition types of the respective PUCCH repetitions, or types of UCI carried in the respective PUCCH repetitions.

The operation flow/algorithmic structure 900 may further include, at 912, determining first PUCCH repetitions have a relatively higher priority. The relative priorities may be determined by referencing one or more of the parameters of the priority information. As described elsewhere, nested priorities may include a plurality of the parameters being referenced in a defined order. For example, if first parameters are equal among the respective PUCCH repetitions, relative priorities may be determined by referencing second parameters, and so on.

The operation flow/algorithmic structure 900 may further include, at 916, transmitting the first PUCCH repetitions and dropping one or more of the second PUCCH repetitions. In some embodiments, only the repetitions of the second PUCCH that overlap/collide with the first PUCCH repetitions may be dropped. Alternatively, all the repetitions of the second PUCCH may be dropped regardless of whether they overlap/collide with the first PUCCH repetitions.

Figure 10:
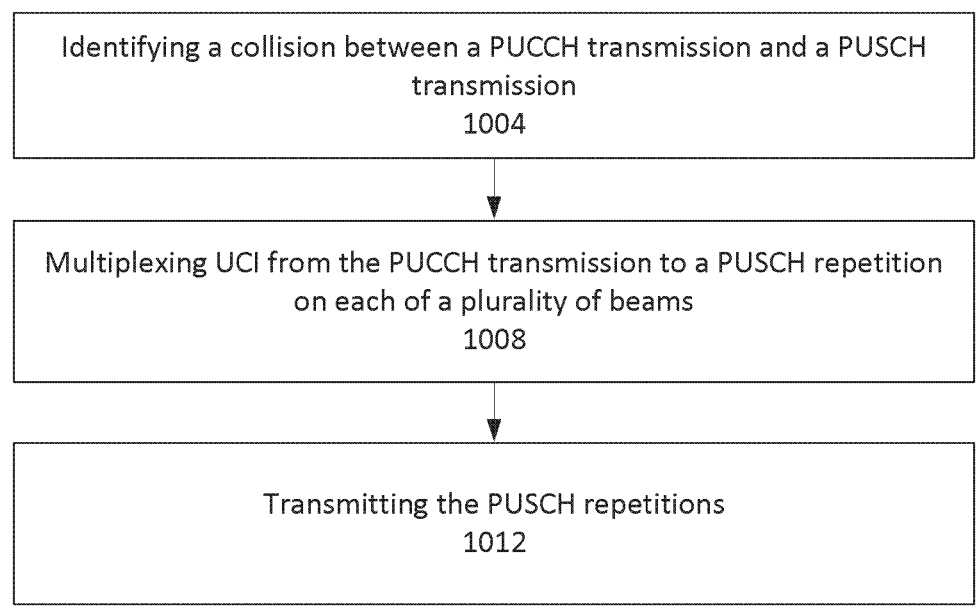
FIG. 10 illustrates another operational flow/algorithmic structure in accordance with some embodiments.

FIG. 10 may include an operation flow/algorithmic structure 1000 in accordance with some embodiments. In some embodiments, the operation flow/algorithmic structure 1000 may be performed or implemented by a UE, for example, UE 104 or 1200; or components thereof, for example, baseband processor 1204A.

The operation flow/algorithmic structure 1000 may include, at 1004, identifying a collision between a PUCCH transmission and a PUSCH transmission. The PUSCH transmission may include a plurality of PUSCH repetitions that are to be transmitted on at least two beams.

The operation flow/algorithmic structure 1000 may further include, at 1008, multiplexing UCI from the PUCCH transmission to a PUSCH repetition on each of a plurality of beams. In some embodiments, the UCI may only be transmitted on one PUSCH repetition per beam. The particular PUSCH repetition may be selected based on timeline constraints. For example, the selected PUSCH repetition may be the earliest occurring PUSCH repetition that is capable of carrying the UCI. In various embodiments, this may be determined based on configuration information provided by a gNB or processing capability of the UE. In other embodiments, the UCI may be multiplexed to all PUSCH repetitions.

The operation flow/algorithmic structure 1000 may further include, at 1012, transmitting the PUSCH repetitions.

Figure 11:
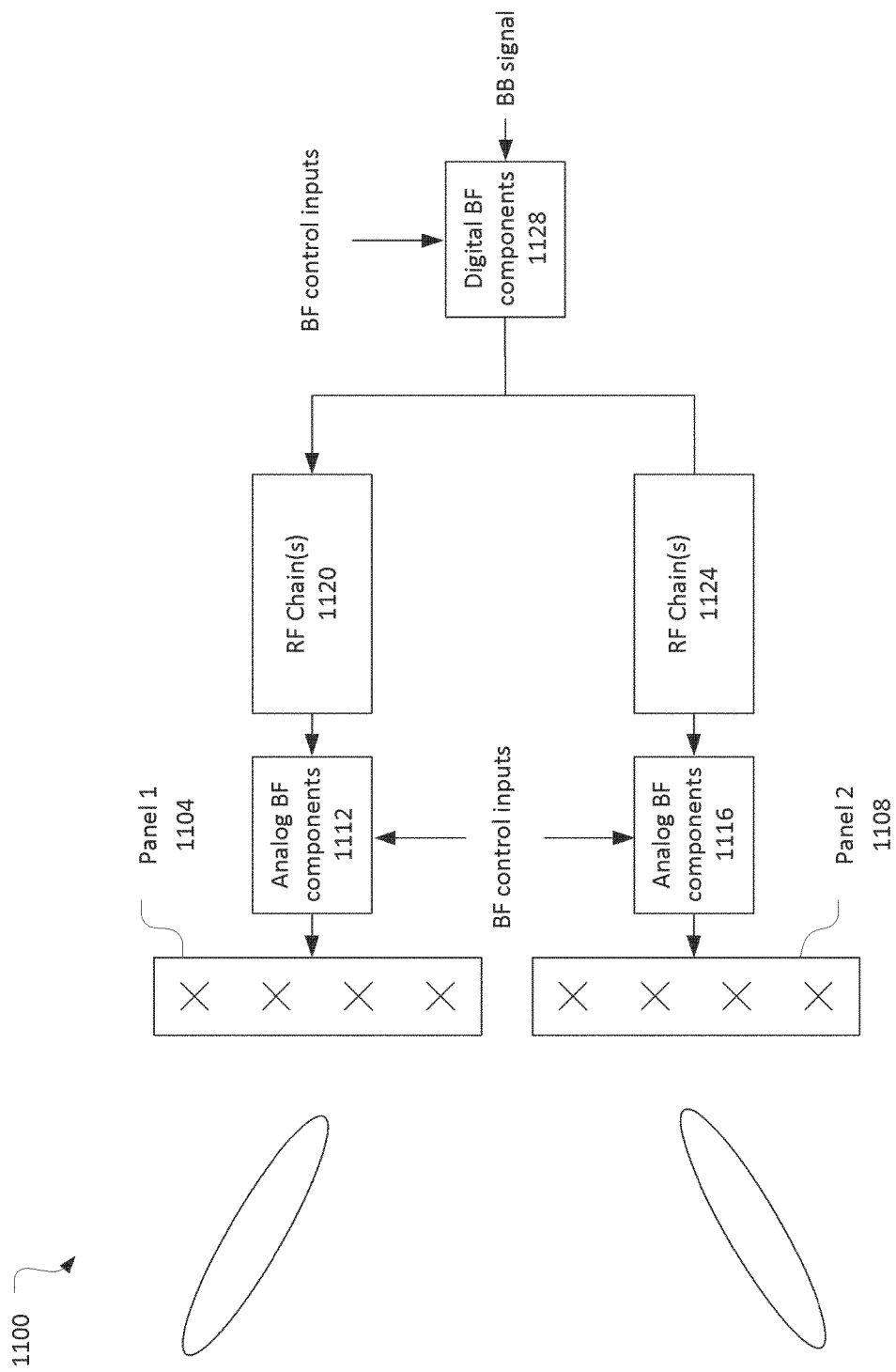
FIG. 11 illustrates beamforming components of a user equipment in accordance with some embodiments.

FIG. 11 illustrates beamforming circuitry 1100 in accordance with some embodiments. The beamforming circuitry 1100 may include a first antenna panel, panel 1 1004, and a second antenna panel, panel 2 1108. Each antenna panel may include a number of antenna elements. Other embodiments may include other numbers of antenna panels.

Figure 12:
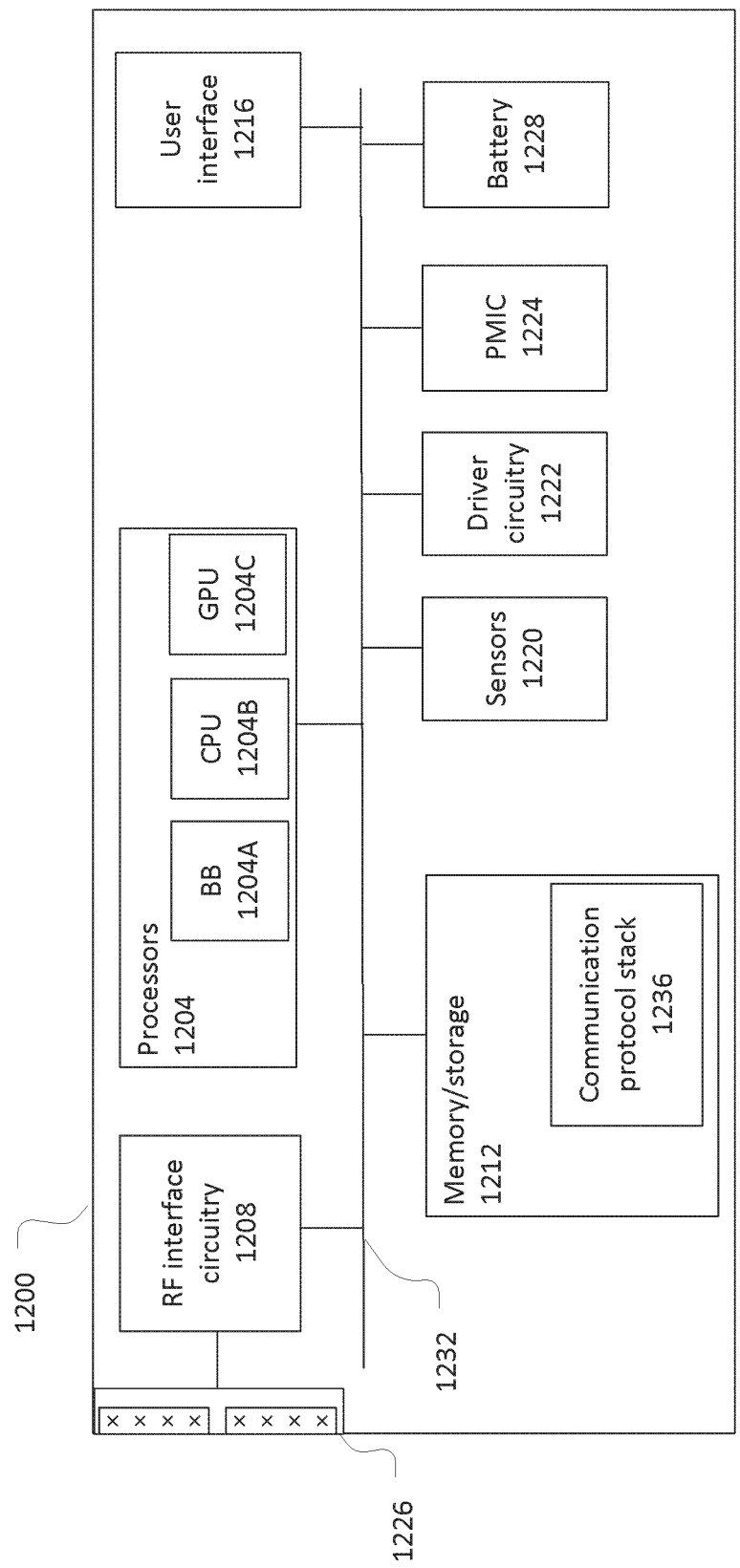
FIG. 12 illustrates a user equipment in accordance with some embodiments.

Digital beamforming (BF) components 1128 may receive an input baseband (BB) signal from, for example, a baseband processor such as, for example, baseband processor 1204A of FIG. 12. The digital BF components 1128 may rely on complex weights to pre-code the BB signal and provide a beamformed BB signal to parallel radio frequency (RF) chains 1120/1124.

Each RF chain 1120/1124 may include a digital-to-analog converter to convert the BB signal into the analog domain; a mixer to mix the baseband signal to an RF signal; and a power amplifier to amplify the RF signal for transmission.

The RF signal may be provided to analog BF components 1112/1116, which may apply additionally beamforming by providing phase shifts in the analog domain. The RF signals may then be provided to antenna panels 1104/1108 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 12 illustrates a UE 1200 in accordance with some embodiments. The UE 1200 may be similar to and substantially interchangeable with UE 104 of FIG. 1.

The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE may be a RedCap UE or NR-Light UE.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, optical connection, etc. that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1212 may include one or more non-transitory, computer-readable media that includes instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1222 may include software and hardware elements that operate to control particular devices that are embedded in the UE 1200, attached to the UE 1100, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus save power. If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The UE 1200 may not receive data in this state;

in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising identifying a collision between first physical uplink channel transmission and a second physical uplink channel transmission; determining target transmit receive points (TRPs) for the first and second physical uplink channel transmissions; performing a collision resolution procedure based on the target TRPs; and transmitting the first or second physical uplink channel transmissions based on the collision resolution procedure.

Example 2 includes the method of example 1 or some other example herein, wherein the first physical uplink channel transmission is a physical uplink control channel (PUCCH) transmission without repetition, the second physical uplink channel transmission includes a plurality of physical uplink shared channel (PUSCH) repetitions, a first TRP is the target TRP for both the PUCCH transmission and the plurality of PUSCH repetitions, and, performing the collision resolution procedure comprises: multiplexing uplink control information (UCI) from the PUCCH transmission to all of the plurality of PUSCH repetitions; and transmitting the plurality of PUSCH repetitions with the UCI.

Example 3 includes method of example 1 or some other example herein, wherein the first physical uplink channel transmission is a physical uplink control channel (PUCCH) transmission without repetition, the second physical uplink channel transmission includes a plurality of physical uplink shared channel (PUSCH) repetitions, a first TRP is the target TRP for the PUCCH transmission, a second TRP is the target TRP for the plurality of PUSCH repetitions, and, performing the collision resolution procedure comprises: determining a relative priority between the PUCCH transmission and the plurality of PUSCH repetitions based on information corresponding to the first and second TRPs; dropping a first one of the PUCCH transmission or one or more repetitions of the plurality of PUSCH repetitions based on the relative priority; and transmitting a second one of the PUCCH transmission or the one or more repetitions of the plurality of PUSCH repetitions based on the relative priority.

Example 4 includes the method of example 3 or some other example herein, wherein the information corresponding to the first and second TRPs comprises a first TRP index associated with the first TRP and a second TRP index associated with the second TRP, wherein a higher relative priority is associated with a lower value of the first and second TRP indices.

Example 5 includes a method of example 4 some other example herein, wherein the and second TRP indices comprise first and second control resource set pool indices.

Example 6 includes the method of example 3 or some other example herein, wherein the plurality of PUSCH repetitions are in consecutive slots or in consecutive symbols.

Example 7 includes the method of example 1 or some other example herein, wherein the first physical uplink channel transmission includes a plurality of physical uplink control channel (PUCCH) repetitions, the second physical uplink channel transmission includes a plurality of physical uplink shared channel (PUSCH) repetitions, a first TRP is the target TRP for the PUCCH transmission, a second TRP is the target TRP for the plurality of PUSCH repetitions, and, performing the collision resolution procedure comprises: dropping at least some of the PUCCH repetitions based on a determination that the plurality of PUSCH repetitions have a higher priority than the plurality of PUCCH repetitions; and transmitting the plurality of PUSCH repetitions and any of the plurality of PUCCH repetitions that were not dropped.

Example 8 includes the method of example 7 or some other example herein, wherein dropping at least some of the PUCCH repetitions includes drop all the PUCCH repetitions or drop only PUCCH repetitions that overlap with the plurality of PUSCH repetitions.

Example 9 includes the method of example 1 or some other example herein, wherein the first physical uplink channel transmission includes a plurality of physical uplink control channel (PUCCH) repetitions and the second physical uplink channel transmission is a physical uplink shared channel (PUSCH) transmission without repetition.

Example 10 includes the method comprising storing a first plurality of physical uplink control channel (PUCCH) repetitions and a second plurality of PUCCH repetitions; detecting a collision between the first plurality of PUCCH repetitions and the second plurality of PUCCH repetitions; determining first priority information associated with the first plurality of PUCCH repetitions and second priority information associated with the second plurality of repetitions, wherein the first and second priority information include associated transmit-receive point (TRP) indices, number of beams configured for transmission, starting slot indices, or repetition types; determining, based on the first and second priority information, the first plurality of PUCCH repetitions has a higher priority than the second plurality of repetitions; and dropping one or more repetitions of the second plurality of PUCCH repetitions based on determination that the first plurality of PUCCH repetitions has the higher priority.

Example 11 includes the method of example 10 or some other example herein, wherein the first priority information includes a first TRP index, the second priority information includes a second TRP index, and the UE is to determine the first plurality of PUCCH repetitions has the higher priority based on the first TRP index having a value that is less than the second TRP index.

Example 12 includes the method of example 10 or some other example herein, wherein the first priority information includes a first number of beams configured for transmitting the first plurality of PUCCH repetitions, the second priority information includes a second number of beams configured for transmitting the second plurality of PUCCH repetitions, and the method further comprises determining the first plurality of PUCCH repetitions has a higher priority based on the first number of beams being greater than the second number of beams.

Example 13 includes the method of example 10 or some other example herein, wherein the first and second priority information further include types of uplink control information carried by the first plurality of PUCCH repetitions and the second plurality of PUCCH repetitions.

Example 14 includes the method of example 13 or some other example herein, wherein the first priority information includes a first number of beams configured for transmitting the first plurality of PUCCH repetitions and a first type of UCI of the first plurality of PUCCH repetitions, the second priority information includes a second number of beams configured for transmitting the second plurality of PUCCH repetitions and a second type of UCI of the first plurality of PUCCH repetitions, and, if the first number of beams is equal to the second number of beams, the method comprises determining the first plurality of PUCCH repetitions has the higher priority based on a determination that the first type of UCI has a higher priority than the second type of UCI.

Example 15 includes the method of example 13 or some other example herein, wherein the first priority information includes a first TRP index to identify a first TRP to which the first plurality of PUCCH repetitions are to be transmitted and a first type of UCI of the first plurality of PUCCH repetitions, the second priority information includes a second TRP index to identify a second TRP to which the second plurality of PUCCH repetitions are to be transmitted and a second type of UCI of the second plurality of PUCCH repetitions, and, if the first TRP index is equal to the second TRP index, the method further comprises determining the first plurality of PUCCH repetitions has the higher priority based on a determination that the first type of UCI has a higher priority than the second type of UCI.

Example 16 includes a method of operating a UE comprising: identifying a collision between a physical uplink control channel (PUCCH) transmission and a physical uplink shared channel (PUSCH) transmission, wherein the PUSCH transmission includes a plurality of PUSCH repetitions to be transmitted on at least two beams; multiplexing uplink control information (UCI) from the PUCCH transmission to a first PUSCH repetition to be transmitted on a first beam of the at least two beams and to a second PUSCH repetition to be transmitted on a second beam of the at least two beams; and transmitting the plurality of PUSCH repetitions.

Example 17 includes the method of example 16 or some other example herein, wherein said multiplexing comprises multiplexing UCI from the PUCCH transmission to each of the plurality of PUSCH repetitions.

Example 18 includes the method of example 16 or some other example herein, further comprising: selecting, as the first PUSCH repetition, an earliest PUSCH repetition of the first beam that meets a timeline constraint associated with the UCI; selecting, as the second PUSCH repetition, an earliest PUSCH repetition of the second beam that meets the timeline constraint associated with the UCI.

Example 19 includes a method of example 18 or some other example herein, wherein the first PUSCH repetition is the earliest PUSCH repetition of the first beam that meets the timeline constraint and is actually to be transmitted; and the second PUSCH repetition is the earliest PUSCH repetition of the second beam that meets the time constraint and is actually to be transmitted.

Example 20 includes the method of example 16 or some other example herein, wherein the first beam in the second beam include different sounding reference signal resource indicators, transmission precoder or matrix indicators, or power control parameters.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
    identify a collision between first physical uplink channel transmission and a second physical uplink channel transmission, wherein the first physical uplink channel transmission is a physical uplink control channel (PUCCH) transmission without repetition and the second physical uplink channel transmission includes a plurality of physical uplink shared channel (PUSCH) repetitions;
    determine a first target transmit receive point (TRP) for the first physical uplink channel transmission;
    determine a second target TRP for the second physical uplink channel transmission;
    perform a collision resolution procedure based on the first and second target TRPs, wherein to perform the collision resolution procedure the processing circuitry is to:
    determine a relative priority between the PUCCH transmission and the plurality of PUSCH repetitions based on information corresponding to the first and second TRPs;
    drop a first one of the PUCCH transmission or one or more repetitions of the plurality of PUSCH repetitions based on the relative priority; and
    output for transmission a second one of the PUCCH transmission or the one or more repetitions of the plurality of PUSCH repetitions based on the relative priority.

2. The one or more non-transitory, computer-readable media of claim 1, wherein the information corresponding to the first and second TRPs comprises a first TRP index associated with the first TRP and a second TRP index associated with the second TRP, wherein a higher relative priority is associated with a lower value of the first and second TRP indices.

3. The one or more non-transitory, computer-readable media of claim 2, wherein the first and second TRP indices comprise first and second control resource set pool indices.

4. The one or more non-transitory, computer-readable media of claim 1, wherein the plurality of PUSCH repetitions are in consecutive slots or in consecutive symbols.

5. A method comprising:
    identifying a collision between a physical uplink control channel (PUCCH) transmission and a physical uplink shared channel (PUSCH) transmission, wherein the PUSCH transmission includes a plurality of PUSCH repetitions to be transmitted on at least two beams;
    selecting, as a first PUSCH repetition, an earliest PUSCH repetition that is to be transmitted on a first beam that meets a timeline constraint associated with uplink control information (UCI);
    selecting, as a second PUSCH repetition, an earliest PUSCH repetition that is to be transmitted on a second beam of the at least two beams that meets the timeline constraint associated with the UCI;
    multiplexing UCI from the PUCCH transmission to the first PUSCH repetition and to the second PUSCH repetition; and
    outputting the plurality of PUSCH repetitions for transmission.

6. The method of claim 5, wherein the first PUSCH repetition is the earliest PUSCH repetition of the first beam that meets the timeline constraint and is actually to be transmitted; and the second PUSCH repetition is the earliest PUSCH repetition of the second beam that meets the time constraint and is actually to be transmitted.

7. The method of claim 5, wherein the first beam and the second beam include different sounding reference signal resource indicators, transmission precoder matrix indicators, or power control parameters.

* * * * *